(12) United States Patent
Li

(10) Patent No.: US 11,509,142 B2
(45) Date of Patent: Nov. 22, 2022

(54) ELECTRICAL POWER SYSTEM

(71) Applicant: TOSHIBA MITSUBISHI-ELECTRIC INDUSTRIAL SYSTEMS CORPORATION, Chuo-ku (JP)

(72) Inventor: Haiqing Li, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 3 days.

(21) Appl. No.: 17/416,945

(22) PCT Filed: Jul. 2, 2019

(86) PCT No.: PCT/JP2019/026354
§ 371 (c)(1),
(2) Date: Jun. 21, 2021

(87) PCT Pub. No.: WO2021/001936
PCT Pub. Date: Jan. 7, 2021

(65) Prior Publication Data
US 2022/0077687 A1 Mar. 10, 2022

(51) Int. Cl.
*H02J 3/38* (2006.01)
*H02J 7/00* (2006.01)
(Continued)

(52) U.S. Cl.
CPC ............... *H02J 3/381* (2013.01); *H02J 3/32* (2013.01); *H02J 7/0068* (2013.01); *H02J 7/35* (2013.01);
(Continued)

(58) Field of Classification Search
CPC .. H02J 3/381; H02J 3/32; H02J 7/0068; H02J 7/35; H02J 2300/26; H02J 3/38; H02J 7/00; H02S 40/32; H02S 40/38
See application file for complete search history.

(56) References Cited

U.S. PATENT DOCUMENTS

2016/0172864 A1 6/2016 Terazono et al.

FOREIGN PATENT DOCUMENTS

| JP | 2014-128164 A | 7/2014 |
| JP | 2017-51 083 A | 3/2017 |

(Continued)

OTHER PUBLICATIONS

International Search Report dated Aug. 27, 2019 in PCT/JP2019/026354 filed on Jul. 2, 2019, 2 pages.
(Continued)

*Primary Examiner* — Robert L Deberadinis
(74) *Attorney, Agent, or Firm* — Oblon, McClelland, Maier & Neustadt, L.L.P.

(57) ABSTRACT

An electrical power system includes: a solar battery panel; a first electrical power conversion device; a secondary battery; and a second electrical power conversion device. The first electrical power conversion device and the second electrical power conversion device selectively execute a first mode in which the first electrical power conversion device performs MPPT control on the solar battery panel and the second electrical power conversion device performs the charging-discharging control and a second mode in which the first electrical power conversion device performs output limit control to restrict output electrical power from exceeding a predetermined output limiter value and the second electrical power conversion device performs MPPT control on the solar battery panel.

6 Claims, 4 Drawing Sheets

(51) Int. Cl.
     *H02S 40/32*    (2014.01)
     *H02S 40/38*    (2014.01)
     *H02J 3/32*     (2006.01)
     *H02J 7/35*     (2006.01)
(52) U.S. Cl.
     CPC .............. *H02S 40/32* (2014.12); *H02S 40/38*
                       (2014.12); *H02J 2300/26* (2020.01)

(56)             References Cited

FOREIGN PATENT DOCUMENTS

JP       2018-153011 A      9/2018
WO    WO 2015/029138 A1     3/2015

OTHER PUBLICATIONS

Chinese Office Action dated Mar. 3, 2022 in Chinese Patent Application No. 201980085546.2 (with English translation), 15 pages.

ELECTRICAL POWER SYSTEM

FIELD

The present invention relates to an electrical power system.

BACKGROUND

Conventionally, a technology of restricting output electrical power of a solar power generation system to a constant range has been known as disclosed in, for example, WO 2015/029138. In a solar power generation system that performs system interconnect, the range of allowed output electrical power is determined due to a relation with an electrical power grid. According to the above-described conventional technology, a site upper limit set value is set, and the output electrical power of the solar power generation system is restricted from exceeding the site upper limit set value.

CITATION LIST

Patent Literature

[PTL 1] WO 2015/029138

SUMMARY

Technical Problem

In the above-described conventional technology, with the site upper limit set value as a limiter value, the output electrical power is restricted so that the output electrical power does not exceed the limiter value. This output restriction can cause an adverse effect due to a relation with MPPT control. Specifically, generated electrical power of the solar battery panel is maximally extracted typically when MPPT control (which is maximum power point tracking control) is performed on a solar battery panel. However, when output limit control is performed, the value of input direct voltage of an electrical power conversion device is restricted to a value smaller than an optimum operating point voltage.

When MPPT control is performed, the output electrical power of the solar battery panel reaches an output limiter value before a maximum output electrical power operating point in some cases. In such a case, the output electrical power is restricted by the output limit control not to increase a power generation amount. When such a situation occurs, the power generation amount of the solar battery panel is restricted although a larger power generation amount could be obtained otherwise, which is a problem.

The present application is intended to solve a problem as described above and provide an electrical power system modified to obtain a larger power generation amount.

Solution to Problem

A first electrical power system of the present application comprises:
a solar battery panel;
a first electrical power conversion device that is configured to convert direct-current power from the solar battery panel into alternating-current power and output the alternating-current power to an electrical power grid;
a secondary battery; and
a second electrical power conversion device that has a first input-output end connected with a connection point between the solar battery panel and the first electrical power conversion device, has a second input-output end connected with the secondary battery, and is configured to perform charging-discharging control including charging control in which the secondary battery is charged with direct voltage at the connection point and discharging control in which electrical power stored in the secondary battery is discharged to the connection point,
wherein the first electrical power conversion device and the second electrical power conversion device are configured to selectively execute a first mode in which the first electrical power conversion device performs MPPT control on the solar battery panel and the second electrical power conversion device performs the charging-discharging control and a second mode in which the first electrical power conversion device performs output limit control to restrict output electrical power from exceeding a predetermined output limiter value and the second electrical power conversion device performs MPPT control on the solar battery panel.

A second electrical power system of the present application comprises:
a solar battery panel;
a first electrical power conversion device that is configured to convert direct-current power from the solar battery panel into alternating-current power and output the alternating-current power to an electrical power grid;
a secondary battery;
a second electrical power conversion device that has a first input-output end connected with a connection point between the solar battery panel and the first electrical power conversion device, has a second input-output end connected with the secondary battery, and is configured to perform charging-discharging control including charging control in which the secondary battery is charged with direct voltage at the connection point and discharging control in which electrical power stored in the secondary battery is discharged to the connection point; and
a higher-level control device connected with the first electrical power conversion device and the second electrical power conversion device, wherein
the higher-level control device has a first mode in which the first electrical power conversion device performs MPPT control on the solar battery panel and the second electrical power conversion device performs the charging-discharging control and a second mode in which the first electrical power conversion device performs output limit control to restrict output electrical power from exceeding a predetermined output limiter value and the second electrical power conversion device performs MPPT control on the solar battery panel, and
the higher-level control device is configured to cause the first electrical power conversion device and the second electrical power conversion device to selectively execute the first mode and the second mode.

Advantageous Effects of Invention

According to the present application, authority to execute MPPT control can be handed over between a first electrical power conversion device and a second electrical power conversion device. According to a second mode in which the second electrical power conversion device executes MPPT control, generated electrical power can be maximally extracted from a solar battery panel, and this electrical power can be stored in the secondary battery. Accordingly, an excessive power generation amount, which is has been conventionally restricted by output limit control from being output to an electrical power grid side, can be extracted from the solar battery panel. As a result, the power generation amount of the electrical power system can be increased.

DESCRIPTION OF EMBODIMENTS

Figure 1:
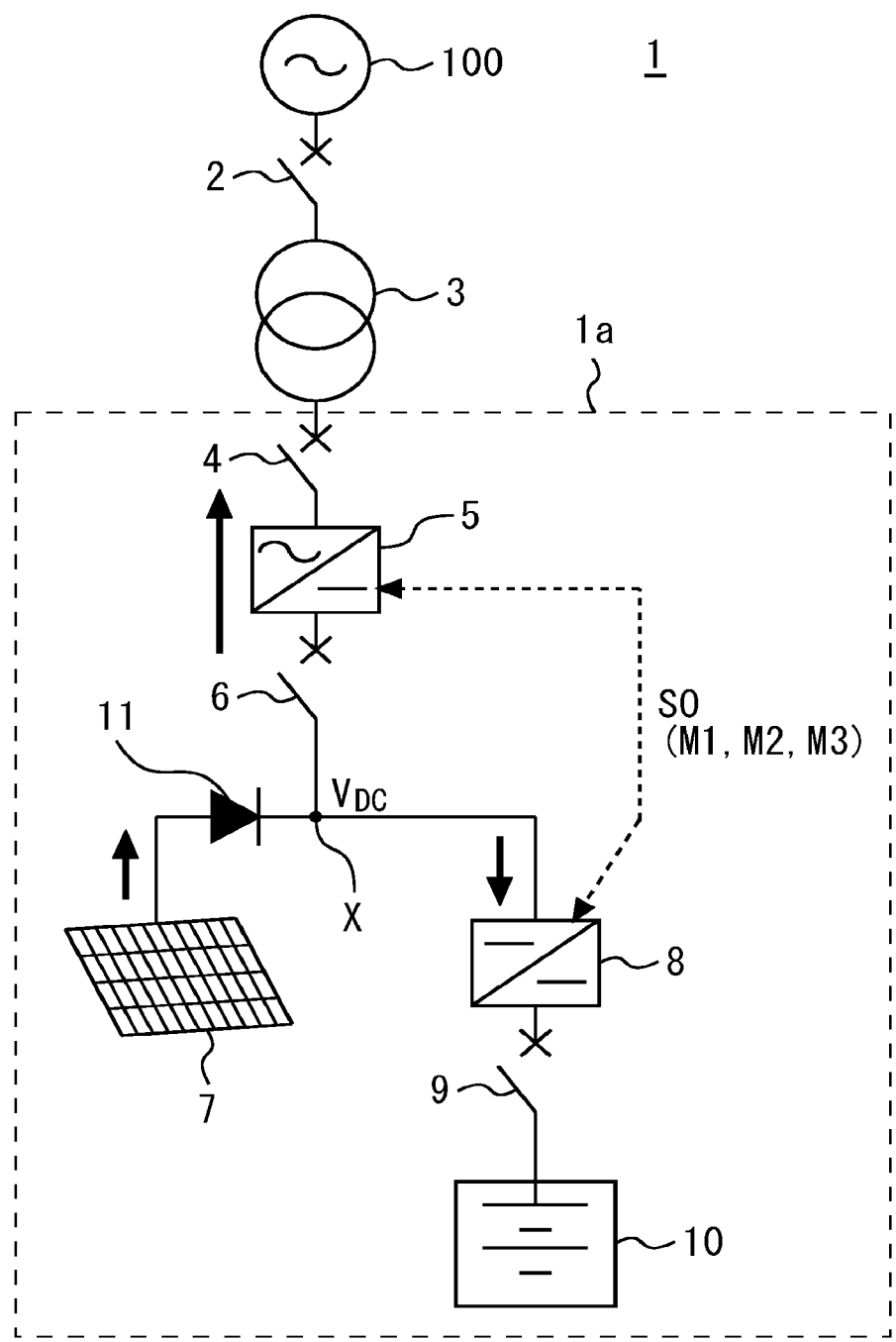
FIG. 1 is a diagram illustrating the configuration of an electrical power system according to an embodiment.

FIG. 1 is a diagram illustrating the configuration of an electrical power system 1 according to an embodiment. The electrical power system 1 includes a direct-current link power generation system 1a, a system-side switch 2, and an interconnect transformer 3. One end of the system-side switch 2 is connected with an electrical power gird 100, and the other end of the system-side switch 2 is connected with one end of the interconnect transformer 3. The other end of the interconnect transformer 3 is connected with one end of an alternating-current-side switch 4 in the direct-current link power generation system 1a.

The direct-current link power generation system 1a includes the alternating-current-side switch 4, a first electrical power conversion device 5, a direct-current-side switch 6, a solar battery panel 7, a second electrical power conversion device 8, an electrical storage switch 9, a secondary battery 10, and a backflow prevention diode 11. The first electrical power conversion device 5 and the second electrical power conversion device 8 are also referred to as a power conditioner system (PCS).

The direct-current link power generation system 1a has a system configuration of a DC link scheme. In accordance with the DC link scheme, a secondary battery system (which is the second electrical power conversion device 8 and the secondary battery 10) is connected with a direct-current (DC) path connecting the solar battery panel 7 and the first electrical power conversion device 5.

The other end of the alternating-current-side switch 4 is connected with an alternating-current output end of the first electrical power conversion device 5. One end of the direct-current-side switch 6 is connected with a direct-current input end of the first electrical power conversion device 5.

The other end of the direct-current-side switch 6 is connected with the cathode of the backflow prevention diode 11 through a connection point X. The anode of the backflow prevention diode 11 is connected with the solar battery panel 7.

In the embodiment, FIG. 1 only illustrates one direct-current link power generation system 1a for simplification, but the electrical power system 1 may be configured so that a plurality of direct-current link power generation systems 1a connected in parallel are connected with the other end of the interconnect transformer 3. The solar battery panel 7 may be provided as a solar battery array in which a large number of solar battery modules are connected with each other in series and parallel.

The first electrical power conversion device 5 is configured to convert direct-current power from the solar battery panel 7 into alternating-current power and output the alternating-current power to the electrical power grid 100. The first electrical power conversion device 5 includes a first electrical power conversion circuit and a first electrical power conversion control circuit. The first electrical power conversion circuit is, for example, a voltage-type three-phase alternating-current inverter circuit configured by a semiconductor switching element such as IGBT. The first electrical power conversion control circuit performs on-off control of the semiconductor switching element of the first electrical power conversion circuit by generating a PWM control signal as a gate pulse based on an output upper limit limiter $P^*_1$ from a nonillustrated higher-level control device (for example, a main site controller).

As illustrated in FIG. 1, the connection point X is also connected with a first input-output end of the second electrical power conversion device 8. A second input-output end of the second electrical power conversion device 8 is connected with the secondary battery 10 through the electrical storage switch 9.

Various electrical storage devices for an energy storage system (ESS) can be used as the secondary battery 10. The secondary battery 10 may be selected from a group consisting an electric double-layer capacitor (EDLC), a lithium-ion capacitor (LIC), a lithium-ion secondary battery (LIB), a nickel-hydrogen battery, a SciB (registered trademark) using lithium titanate, a lead battery, a sodium-sulfur battery, and a fuel cell (FC).

The secondary battery 10 and the second electrical power conversion device 8 are connected with each other through the electrical storage switch 9. The secondary battery 10 includes a secondary battery body, and a battery management unit (BMU) that manages the state of charge (SOC) and the like of the secondary battery body. Battery state information such as the SOC of the secondary battery 10 is transferred from the BMU to the second electrical power conversion device 8. Note that, as a modification, the battery state information may be transferred to the second electrical power conversion device 8 through the nonillustrated higher-level control device. In other words, the BMU and the second electrical power conversion device 8 do not need to directly intercommunicate with each other.

The second electrical power conversion device 8 is connected with the connection point X between the solar battery panel 7 and the direct-current-side switch 6. The second electrical power conversion device 8 includes a second electrical power conversion circuit and a second electrical power conversion control circuit. Various well-known DC-DC converter circuits may be used as the second electrical power conversion circuit. For example, the second electrical power conversion circuit may be a PWM switching converter or may be a buck-boost converter including a chopper circuit. The second electrical power conversion control circuit performs on-off control of a semiconductor switching element such as an IGBT or a MOSFET included in the second electrical power conversion circuit based on a higher-level command signal from the nonillustrated higher-level control device (for example, the main site controller).

The second electrical power conversion device 8 is configured to perform charging-discharging control. The charging-discharging control includes charging control and discharging control. The charging control is a control mode in which the secondary battery 10 is charged with direct voltage $V_{DC}$ at the connection point X. The discharging control is a control mode in which electrical power stored in the secondary battery 10 is discharged to the connection point X.

A command value is included in the higher-level command signal from the nonillustrated higher-level control device. The command value has a content determined in accordance with the kind and operation method of the secondary battery 10 and may be an active electrical power command $P^*_2$ or may be a current command value or a voltage command value. The second electrical power conversion device 8 actuates to perform inputting and outputting of active electrical power to and from the connection point X based on the command value included in the higher-level command signal. In addition, in the electrical power system 1 according to the embodiment illustrated in FIG. 1, a communication line is provided between the first electrical power conversion device 5 and the second electrical power conversion device 8. A mode setting signal S0 is communicated through the communication line.

The mode setting signal S0 is a bidirectional signal for performing switching among a first mode M1, a second mode M2, and a third mode M3 between the first electrical power conversion device 5 and the second electrical power conversion device 8. The first electrical power conversion device 5 and the second electrical power conversion device 8 cooperatively perform control by communicating the mode setting signal S0.

In the embodiment, table information defined by Table 1 below in which a correspondence relation with the mode setting signal S0 is determined is stored in the first electrical power conversion device 5 and the second electrical power conversion device 8 in advance. The first electrical power conversion device 5 and the second electrical power conversion device 8 are configured to selectively execute the first mode M1, the second mode M2, and the third mode M3 in accordance with the contents of the mode setting signal S0.

TABLE 1

|  | First electrical power conversion device 5 (PV-PCS) | Second electrical power conversion device 8 (BAT-PCS) |
| --- | --- | --- |
| First mode M1 | MPPT control | Charging-discharging control by higher-level control device |
| Second mode M2 | Output limit control | Charging by MPPT control |
| Third mode M3 | MPPT control/in range not exceeding output limiter value $P_{limit}$) | Stopped |

The first mode M1 is a control mode in which the first electrical power conversion device 5 performs MPPT control (which is maximum power point tracking control) on the solar battery panel 7 and the second electrical power conversion device 8 performs the charging-the discharging control. The charging-the discharging control in the first mode M1 performs switching between the charging control and the discharging control based on the higher-level command signal from the nonillustrated higher-level control device as described above.

The second mode M2 is a control mode in which the first electrical power conversion device 5 is fixed to output limit control and the second electrical power conversion device 8 performs MPPT control on the solar battery panel 7. In the output limit control in the second mode M2, the value of a smaller one of the output upper limit limiter $P^*_1$ from the nonillustrated higher-level control device and a predetermined output limiter value $P_{pesmax}$ is set as an output limiter value $P_{limit}$. The first electrical power conversion device 5 restricts output electrical power from exceeding the output limiter value $P_{limit}$.

The third mode M3 is a control mode in which the first electrical power conversion device 5 performs MPPT control in a range not exceeding the output limiter value $P_{limit}$ and the second electrical power conversion device 8 is stopped.

Figure 2:
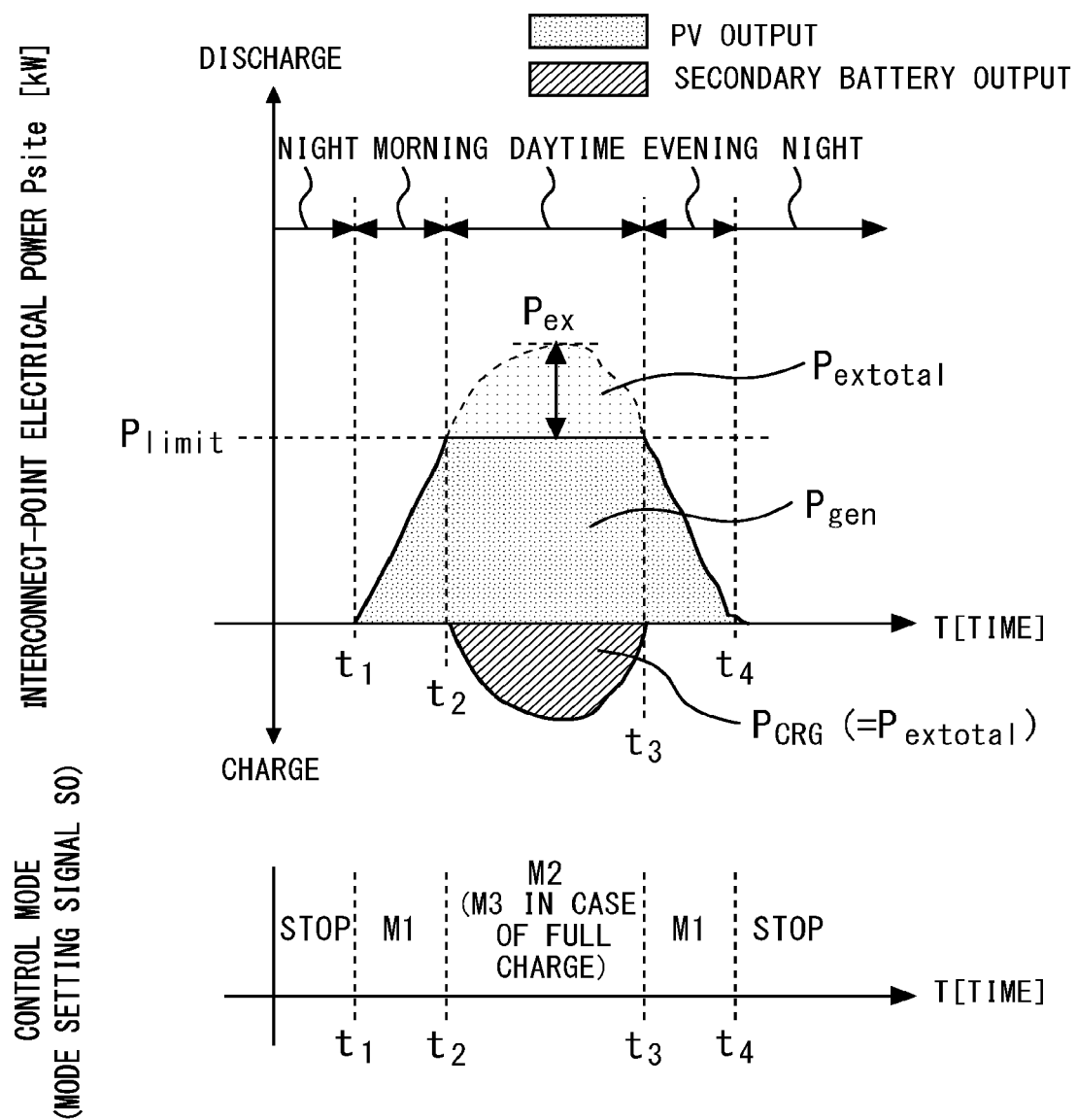
FIG. 2 is a time chart for description of the operation of the electrical power system according to the embodiment.

FIG. 2 is a time chart for description of the operation of the electrical power system 1 according to the embodiment. In FIG. 2, interconnect-point electrical power Psite is site synthesis electrical power that the direct-current link power generation system 1a output to a system interconnect point of the electrical power grid 100. Excessive generated electrical power $P_{ex}$ is a power generation amount exceeding the output limiter value $P_{limit}$. A total excessive generated electrical power amount $P_{extotal}$ is a value obtained by integrating the excessive generated electrical power $P_{ex}$ with respect to time.

Output electrical power $P_{gen}$ is an output portion of a generated electrical power amount generated by the solar battery panel 7, which is output from the direct-current link power generation system 1a to the electrical power grid 100 side. A charged electrical power amount $P_{CRG}$ is a charged electrical power portion of the generated electrical power amount generated by the solar battery panel 7, which is charged to the secondary battery 10. In the embodiment, the charged electrical power amount $P_{CRG}$ is equal to the total excessive generated electrical power amount $P_{extotal}$. This is because an excessive portion of generated power of the solar battery panel 7 can be maximally extracted since the second electrical power conversion device 8 performs MPPT control in the second mode M2.

Times $t_1$, $t_2$, $t_3$, and $t_4$ are expediential times for distinguishing night, morning, daytime, and evening. Time $t_1$ corresponds to sunrise, and Time $t_4$ corresponds to sunset. Control modes, in other words, the contents of the mode setting signal S0 are illustrated in a temporally sequential manner in the lower part of FIG. 2. Note that, in FIG. 2, as an example, the first electrical power conversion device 5 and the second electrical power conversion device 8 are both stopped at night.

Figure 4:
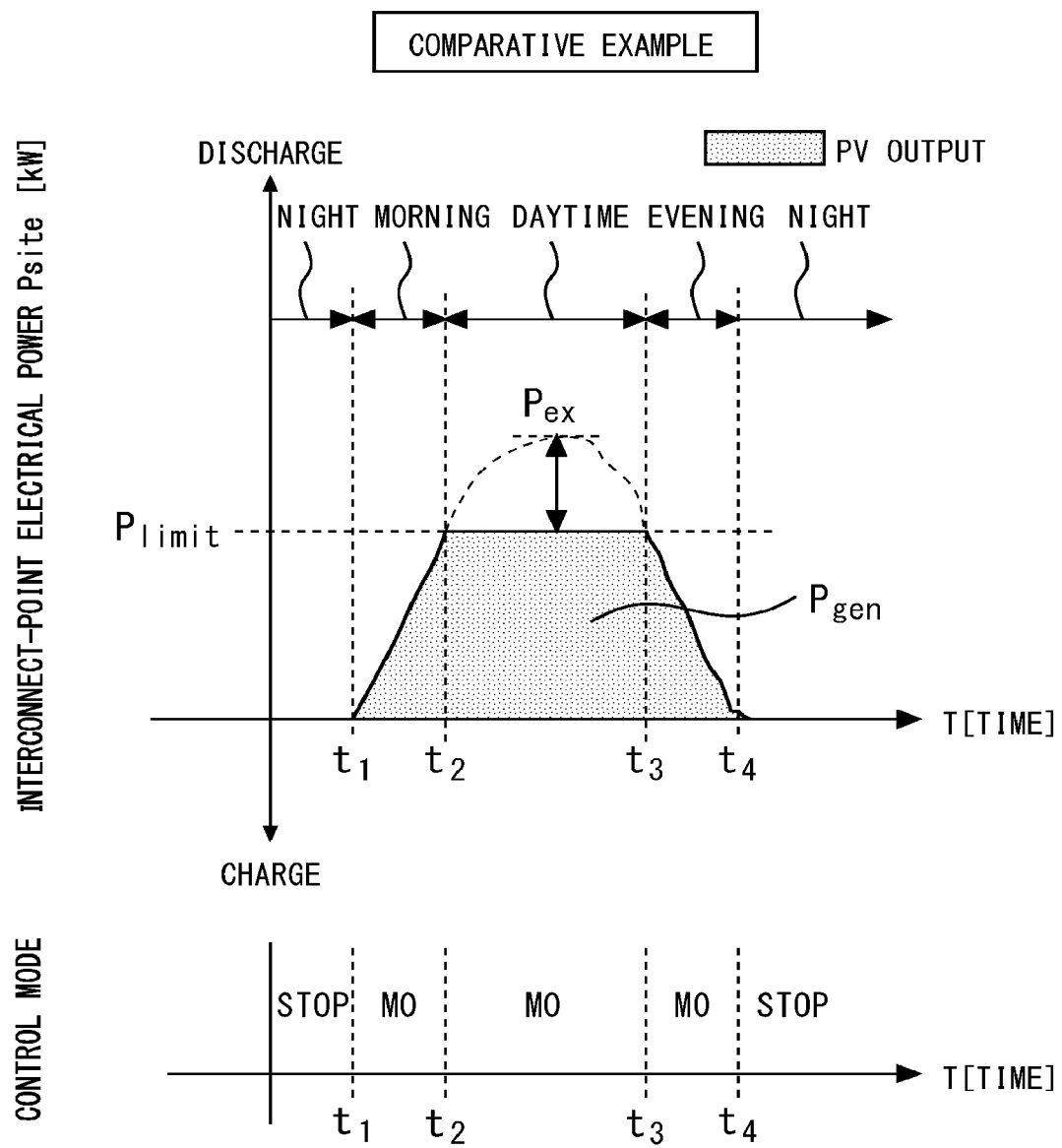
FIG. 4 is a time chart for description of the operation of the electrical power system 1 according to a comparative example.

FIG. 4 is a time chart for description of the operation of the electrical power system 1 according to a comparative example. In the comparative example, unlike the embodiment, a comparative-example mode M0 is executed over the entire duration from Time $t_1$ to Time $t_4$. The contents of the comparative-example mode M0 are listed in Table 2 below.

TABLE 2

|  | First electrical power conversion device 5 (PV-PCS) | Second electrical power conversion device 8 (BAT-PCS) |
| --- | --- | --- |
| Comparative example mode M0 | MPPT control or output limit control | Charging-discharging control by higher-level control device |

In the comparative example of FIG. 4, the output limit control is only performed to restrict the excessive output electrical power $P_{ex}$, and the total excessive generated electrical power amount $P_{extotal}$ is not extracted from the solar battery panel 7. Accordingly, in FIG. 1, the total excessive generated electrical power amount $P_{extotal}$ is extracted as the charged electrical power amount $P_{CRG}$, but in the comparative example of FIG. 4, the charged electrical power amount $P_{CRG}$ is not generated. Thus, in the comparative example, acquisition of the total excessive generated electrical power amount $P_{extotal}$ is inevitably abandoned.

According to the embodiment, as indicated in the above-described Table 1, the first mode M1 and the second mode M2 are selectively executed in accordance with the mode setting signal S0. Through this mode switching, authority to execute MPPT control can be handed over between the first electrical power conversion device 5 and the second electrical power conversion device 8. With the second mode M2 in which the second electrical power conversion device 8 executes MPPT control, generated electrical power can be maximally extracted from the solar battery panel 7, and the electrical power can be stored in the secondary battery 10.

In the comparative example, outputting of the total excessive generated electrical power amount $P_{extotal}$ is restricted by the output limit control to prevent outputting to the electrical power grid 100 side, but in the embodiment, the total excessive generated electrical power amount $P_{extotal}$ extracted from the solar battery panel 7 can be stored in the secondary battery 10 as the charged electrical power amount $P_{CRG}$. As a result, the total power generation amount of the electrical power system 1 in the daytime duration is the sum of $P_{gen}$ and $P_{CRG}$, and thus the total power generation amount of the electrical power system 1 can be increased as compared to the comparative example of FIG. 4.

In the embodiment, among the first electrical power conversion device 5 and the second electrical power conversion device 8, the first electrical power conversion device 5 switches the contents of the mode setting signal S0 from the first mode M1 to the second mode M2 at Time $t_2$ of FIG. 2. Time $t_2$ is a timing at which the output electrical power of the first electrical power conversion device 5 reaches the output limiter value $P_{limit}$ in a duration in which the first mode M1 is performed. Accordingly, automatic switching to the second mode M2 can be promptly and seamlessly executed in response to the need to start the output limit control at the first electrical power conversion device 5.

In the example of the embodiment illustrated in FIG. 2, the first electrical power conversion device 5 and the second electrical power conversion device 8 cooperatively determine the contents of the mode setting signal S0 so that the first mode M1 is selected in the morning duration (Time $t_1$ to Time $t_2$) and the evening duration (Time $t_3$ to Time $t_4$) and the second mode M2 is selected in the daytime duration (Time $t_2$ to Time $t_3$). In the morning duration (Time $t_1$ to Time $t_2$) and the evening duration (Time $t_3$ to Time $t_4$), the output electrical power of the first electrical power conversion device 5 is smaller than the output limiter value $P_{limit}$. In the daytime duration (Time $t_2$ to Time $t_3$), the output electrical power of the first electrical power conversion device 5 reaches the output limiter value $P_{limit}$.

Note that, for sake of simplicity in FIG. 2, the excessive generated electrical power $P_{ex}$ is generated over the entire range of the daytime duration of Time $t_2$ to Time $t_3$, which is however an example. In the embodiment, the excessive generated electrical power $P_{ex}$ is not generated in the daytime duration, in other words, the output electrical power $P_{gen}$ becomes smaller than the output limiter value $P_{limit}$ in the daytime duration, in some cases. In such a case, a time limit may be provided so that the contents of the mode setting signal S0 are changed from the second mode M2 to the first mode M1. Specifically, the control mode may be changed to the first mode M1 when a predetermined time has elapsed since the power generation amount becomes small. For example, the predetermined time may be fixed to a default value or may be set to be variable.

In the embodiment, the second electrical power conversion device 8 changes the contents of the mode setting signal S0 from the second mode M2 to the third mode M3 when the secondary battery 10 is fully charged in a duration in which the second mode M2 is performed in the daytime duration of FIG. 2. The full charge (in other words, the SOC of 100%) of the secondary battery 10 may be transferred from the BMU of the secondary battery 10 to the second electrical power conversion device 8. When the secondary battery 10 is fully charged, a charging limiter is applied at the second electrical power conversion device 8. Alternatively, a control command may be communicated through the nonillustrated higher-level control device so that the second electrical power conversion device 8 is stopped and the first electrical power conversion device 5 is switched to the third mode M3. Note that, as a modification of this control operation, the first mode M1 may be set in place of the third mode M3 in accordance with the full charge of the secondary battery 10, and in this case, the third mode M3 may be omitted.

The second electrical power conversion device 8 may be configured to perform the discharging control in at least one of a predetermined morning duration, a predetermined evening duration, and a predetermined night duration. The morning duration is set in advance in the duration from Time $t_1$ to Time $t_2$ in FIG. 2. The evening duration is set in advance in the duration from Time $t_3$ to Time $t_4$ in FIG. 2. There is a case in which electric power consumption increases in morning and evening, and thus the insufficiency of generated electrical power to the electric power consumption can be compensated by the secondary battery 10. The night duration is the duration from Time $t_4$ of FIG. 2 to Time $t_1$ of the next morning.

Figure 3:
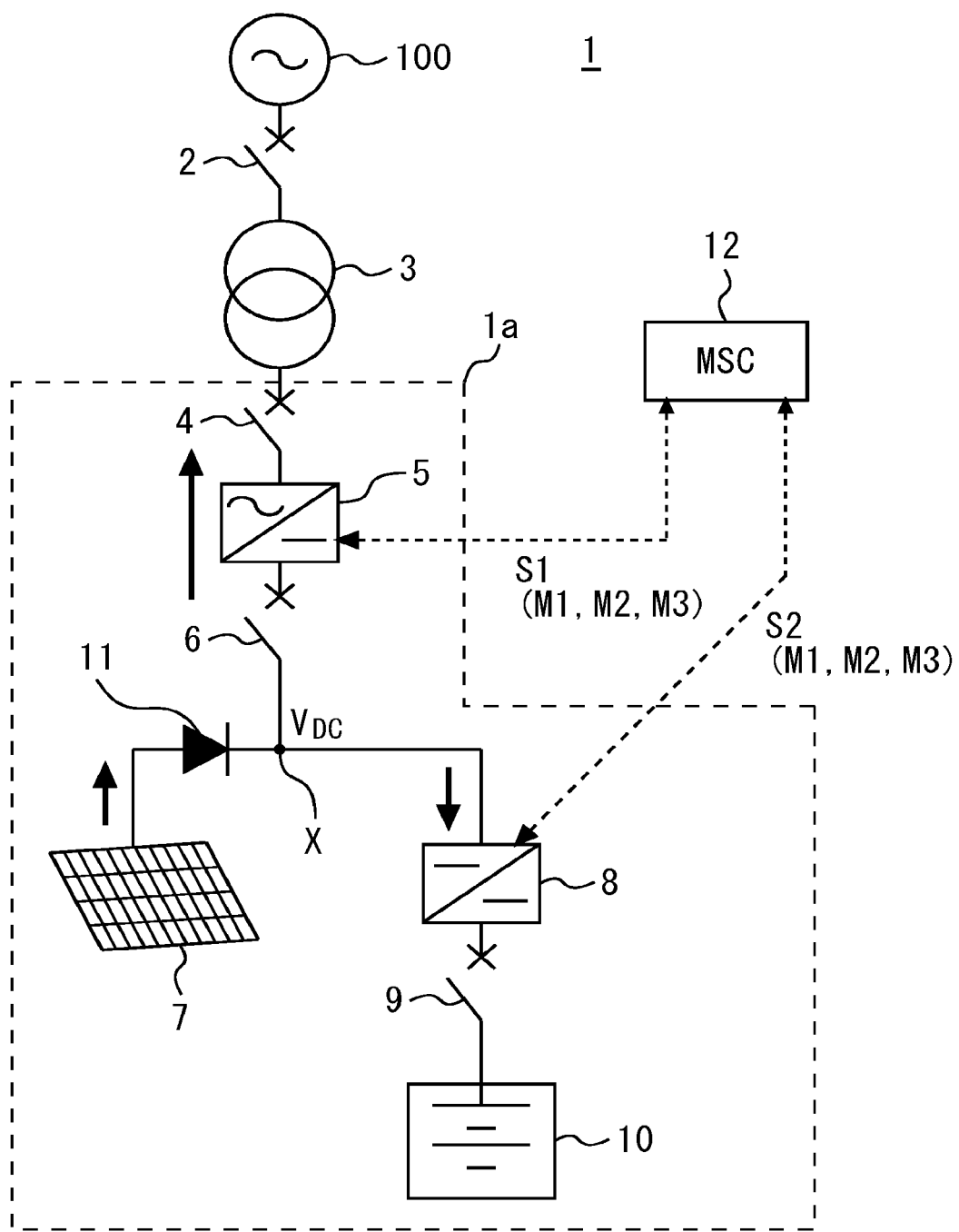
FIG. 3 is a diagram illustrating the configuration of the electrical power system according to a modification of the embodiment.

FIG. 3 is a diagram illustrating the configuration of the electrical power system 1 according to a modification of the embodiment. In the modification of FIG. 3, a main site controller (MSC) 12 that is a higher-level control device is provided. The MSC 12 is connected with each of the first electrical power conversion device 5 and the second electrical power conversion device 8 to perform communication therebetween.

Various kinds of control parameters of the first electrical power conversion device 5 and various kinds of control parameters of the second electrical power conversion device 8 are transferred to the MSC 12. The various kinds of control parameters of the first electrical power conversion device 5 include a control mode, an output alternating current, an output alternating voltage, an input direct current, an input direct voltage, an active electrical power output, and a reactive electrical power output. The control parameters of the second electrical power conversion device 8 include a control mode, an output direct current, an output direct voltage, an input direct current, an input direct voltage, and an active electrical power output. The battery state information such as the SOC of the secondary battery 10 may be transferred to the MSC 12 through the second electrical power conversion device 8. As a modification, battery information and the like may be directly transmitted from the BMU to the MSC 12.

In the above-described configuration of FIG. 1, control mode switching is achieved by cooperative control of the first electrical power conversion device 5 and the second electrical power conversion device 8 through communication of the mode setting signal S0. In contrast, in the modification of FIG. 3, the MSC 12 as a higher-level control device achieves cooperative control of the first electrical power conversion device 5 and the second electrical power conversion device 8 by transmitting and receiving mode setting signals S1 and S2. The mode setting signals S1 and S2 are signals that instruct in which of the first mode M1, the second mode M2, and the third mode M3 the first electrical power conversion device 5 and the second electrical power conversion device 8 should actuate.

The system configuration of FIG. 3 and the system configuration of FIG. 1 are same except for the above-described point, and various modifications described for the system configuration of FIG. 1 are applicable to the MSC 12. Specifically, similarly to the electrical power system 1 of FIG. 1, control operation described below may be performed.

At Time $t_2$ of FIG. 2, the MSC 12 may switch the contents of the mode setting signals S1 and S2 from the first mode M1 to the second mode M2. The MSC 12 may determine the contents of the mode setting signals S1 and S2 so that the first mode M1 is selected in the morning duration (Time $t_1$ to Time $t_2$) and the evening duration (Time $t_3$ to Time $t_4$) and the second mode M2 is selected in the daytime duration (Time $t_2$ to Time $t_3$).

When the output electrical power $P_{gen}$ is smaller than the output limiter value $P_{limit}$ in the daytime duration, the MSC 12 may change the contents of the mode setting signals S1 and S2 from the second mode M2 to the first mode M1. When the secondary battery 10 is fully charged in a duration in which the second mode M2 is performed in the daytime duration of FIG. 2, the MSC 12 may change the contents of the mode setting signals S1 and S2 from the second mode M2 to the third mode M3.

The MSC 12 may cause the second electrical power conversion device 8 to execute the discharging control in at least one of a predetermined morning duration, a predetermined evening duration, and a predetermined night duration. In the system configuration of FIG. 3 as well, the MSC 12 may be configured to execute control operation same as that of the system configuration of FIG. 1.

REFERENCE SIGNS LIST

1 Electrical power system 1a Direct-current link power generation system 2 System-side switch 3 Interconnect transformer 4 Alternating-current-side switch 5 First electrical power conversion device 6 Direct-current-side switch 7 Solar battery panel 8 Second electrical power conversion device 9 Electrical storage switch 10 Secondary battery 11 Backflow prevention diode 100 Electrical power grid M0 Comparative-example mode M1 First mode M2 Second mode M3 Third mode $P_{CRG}$ Charged electrical power amount $P_{ex}$ Excessive output electrical power $P_{extotal}$ Total excessive generated electrical power amount $P_{gen}$ Output electrical power $P_{limit}$ Power generation amount exceeding the output limiter value S0, S1, S2 Mode setting signal X Connection point

The invention claimed is:

1. An electrical power system comprising:
a solar battery panel;
a first electrical power conversion device that is configured to convert direct-current power from the solar battery panel into alternating-current power and output the alternating-current power to an electrical power grid;
a secondary battery; and
a second electrical power conversion device that includes a first input-output end connected with a connection point between the solar battery panel and the first electrical power conversion device, includes a second input-output end connected with the secondary battery, and is configured to perform charging-discharging control including charging control in which the secondary battery is charged with direct voltage at the connection point and discharging control in which electrical power stored in the secondary battery is discharged to the connection point, wherein the first electrical power conversion device and the second electrical power conversion device are configured to selectively execute:
a first mode in which the first electrical power conversion device performs MPPT control on the solar battery panel and the second electrical power conversion device performs the charging-discharging control while the first electrical power conversion device and the second electrical power conversion device are connected with each other through the connection point, and
a second mode in which the first electrical power conversion device performs output limit control that is control to restrict output electrical power from exceeding a predetermined output limiter value and is not MPPT control and the second electrical power conversion device performs MPPT control on the solar battery panel.

2. The electrical power system according to claim 1, wherein the first electrical power conversion device and the second electrical power conversion device are configured to switch the first mode to the second mode when the output electrical power of the first electrical power conversion device has reached the output limiter value in a duration in which the first mode is performed.

3. The electrical power system according to claim 1, wherein the first electrical power conversion device and the second electrical power conversion device are configured to be able to further select a third mode in which the first electrical power conversion device performs MPPT control in a range not exceeding the output limiter value and the second electrical power conversion device is stopped, and the first electrical power conversion device and the second electrical power conversion device are configured to switch a control mode from the second mode to the third mode when the secondary battery is fully charged in a duration in which the second mode is performed.

4. An electrical power system comprising:
a solar battery panel;
a first electrical power conversion device that is configured to convert direct-current power from the solar battery panel into alternating-current power and output the alternating-current power to an electrical power grid;
a secondary battery;
a second electrical power conversion device that includes a first input-output end connected with a connection point between the solar battery panel and the first electrical power conversion device, includes a second input-output end connected with the secondary battery, and is configured to perform charging-discharging control including charging control in which the secondary battery is charged with direct voltage at the connection point and discharging control in which electrical power stored in the secondary battery is discharged to the connection point; and
a higher-level control device connected with the first electrical power conversion device and the second electrical power conversion device, wherein the higher-level control device includes:
- a first mode in which the first electrical power conversion device performs MPPT control on the solar battery panel and the second electrical power conversion device performs the charging-discharging control while the first electrical power conversion device and the second electrical power conversion device are connected with each other through the connection point, and
- a second mode in which the first electrical power conversion device performs output limit control that is control to restrict output electrical power from exceeding a predetermined output limiter value and is not MPPT control and the second electrical power conversion device performs MPPT control on the solar battery panel, and the higher-level control device is configured to cause the first electrical power conversion device and the second electrical power conversion device to selectively execute the first mode and the second mode.

5. The electrical power system according to claim 4, wherein the higher-level control device is configured to switch a control mode of the first electrical power conversion device and the second electrical power conversion device from the first mode to the second mode when the output electrical power of the first electrical power conversion device has reached the output limiter value in a duration in which the first mode is performed.

6. The electrical power system according to claim 4, wherein
- the higher-level control device further has a third mode in which the first electrical power conversion device performs MDPT control in a range not exceeding the output limiter value and the second electrical power conversion device is stopped, and
- the higher-level control device is configured to switch the second mode to the third mode when the secondary battery is fully charged in a duration in which the second mode is performed.

\* \* \* \* \*